Sept. 1, 1931.   F. McMANIS   1,821,352
DEVICE FOR CLEANING AND COATING PIPE
Filed March 22, 1928   6 Sheets-Sheet 3

INVENTOR.
FRED McMANIS,
BY
Jesse R. Stone
ATTORNEY.

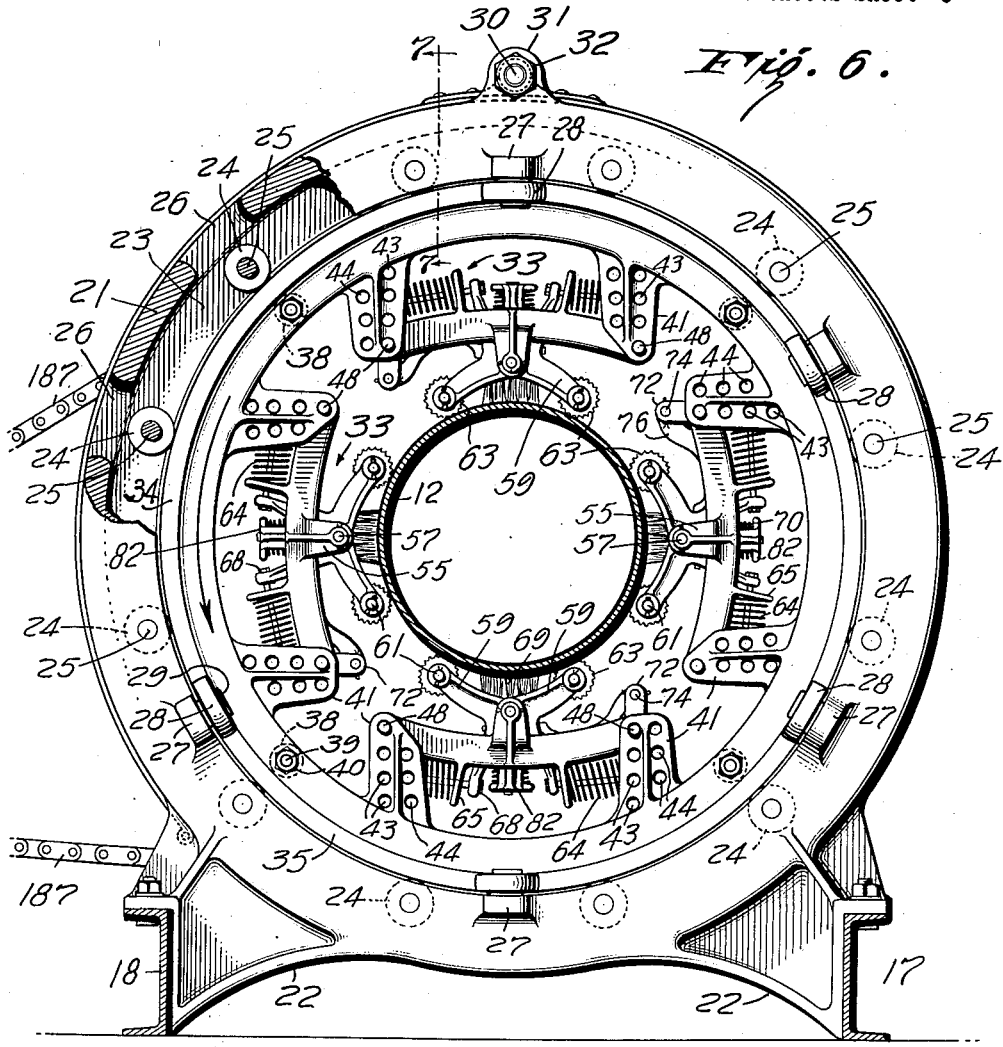
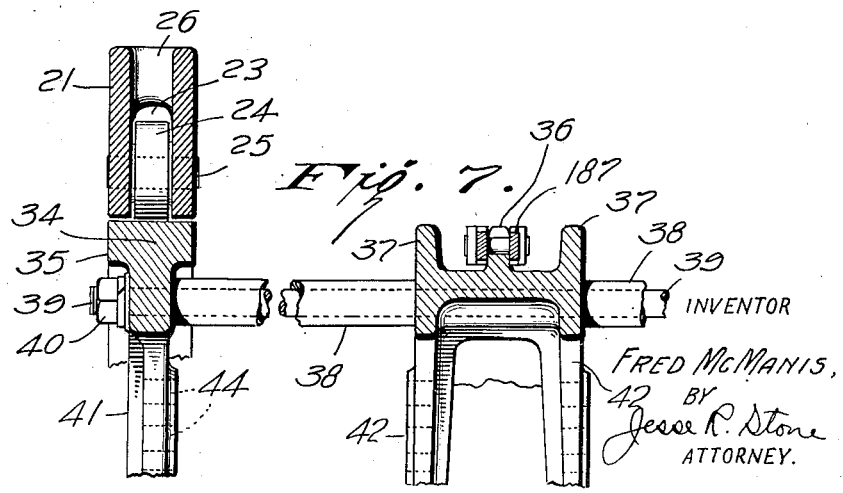

Sept. 1, 1931. F. McMANIS 1,821,352
DEVICE FOR CLEANING AND COATING PIPE
Filed March 22, 1928 6 Sheets-Sheet 6
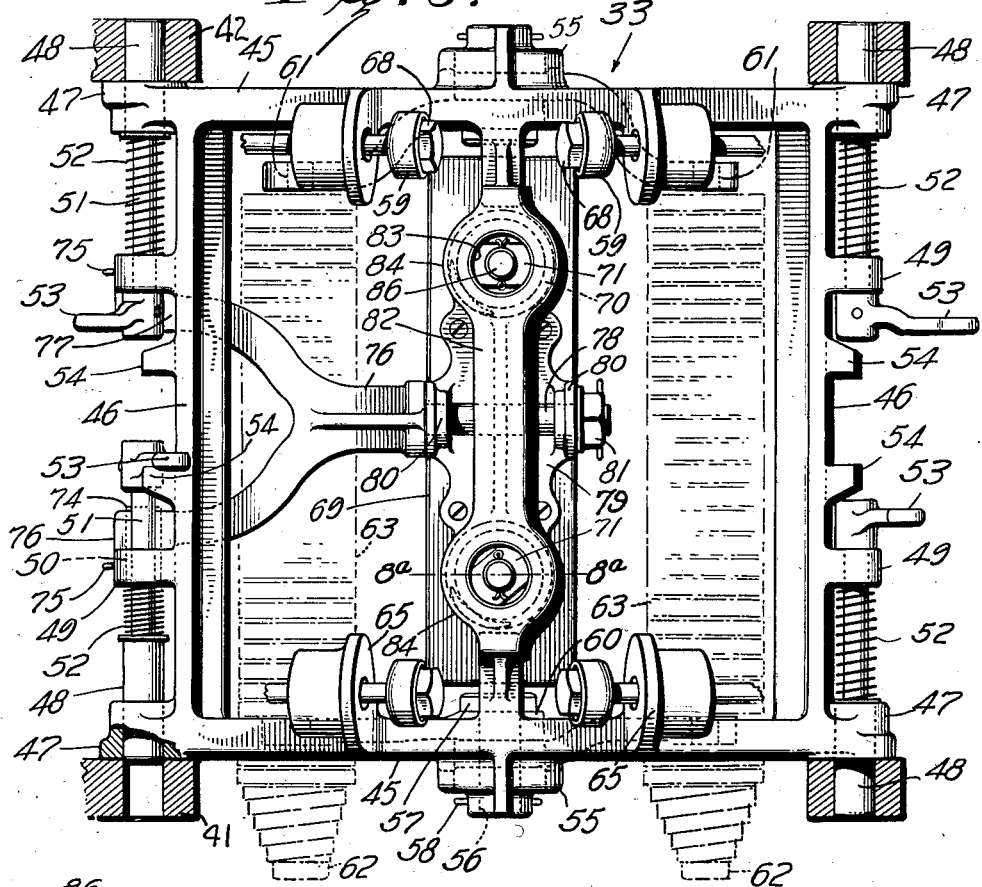
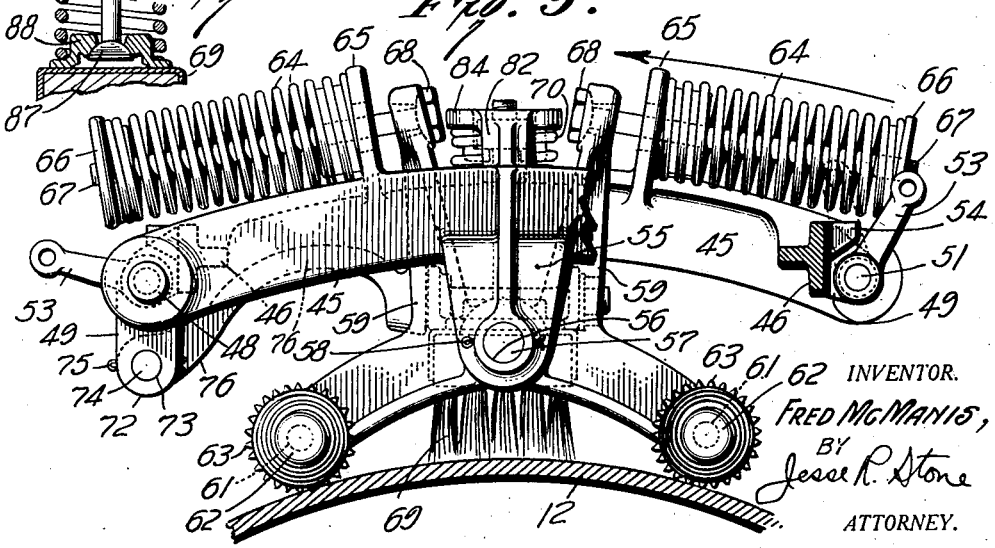
INVENTOR.
FRED McMANIS,
BY Jesse R. Stone
ATTORNEY.

Patented Sept. 1, 1931

1,821,352

UNITED STATES PATENT OFFICE

FRED McMANIS, OF HOUSTON, TEXAS, ASSIGNOR TO W-K-M COMPANY, OF HOUSTON, TEXAS, A CORPORATION OF TEXAS

DEVICE FOR CLEANING AND COATING PIPE

Application filed March 22, 1928. Serial No. 263,780.

My invention relates to an apparatus of the stationary type for cleaning scale and corrosion from the outside of pipe and for applying a protective coating thereto. It is particularly adapted for cleaning large sizes of pipe such as are employed in conducting oil, gas or water for industrial purposes. It is, however, not limited to this particular application.

It is an object of the invention to provide a rotatably mounted frame with means for effectively rotating the same and to mount therein means to clear the pipe so that said means may be readily adjustable for different sizes of pipe, and also to obtain different pressures of the cleaning elements upon the pipe.

The invention also contemplates a resilient mounting for the cleaning elements whereby they are adapted for cleaning irregular pipe and to pass collars or couplings holding together the pipe sections.

It is also an object to provide means for preventing rotation of the pipe and to permit longitudinal movement thereof through a machine.

It is a further object to provide means for supporting the pipe, said means being adapted to exert a traction effort upon the pipe to advance the same through the machine.

The invention also aims to make the parts of the device capable for ready assembly or disassembly, so that the parts may be easily removed from the machine, and also make it possible to manufacture the structure cheaply and economically.

It is also desired to provide control means for the operating mechanism so that the operation of the device may be accomplished positively and quickly.

The invention further aims to provide means to apply a coating to the pipe, said means being simple and easily controlled and operated and by means of which the coating may be applied uniformly.

Referring to the drawings herewith, wherein a preferred embodiment of the invention is disclosed, Fig. 1 is a top plan view of my improved pipe cleaning machine, the upper portion of the housing being partially broken away;

Fig. 6 is a similar view and taken through the same lines but looking in the direction of the arrows 6—6;

Fig. 7 is a detail sectional view taken on the line 7—7 of Fig. 6;

Fig. 8 is a top plan view of one of the pipe cleaning assemblies forming a part of my invention, some parts being broken away and others shown in dotted lines for the sake of clearness;

Fig. 8a is a fragmentary section of the upper portion of the brush, taken on the line 8a—8a through Fig. 8;

Fig. 9 is a side elevation of the Fig. 8 assembly partially broken away and shown in section;

Fig. 10 is a somewhat diagrammatic illustration of another form of painting device associated with my invention;

Fig. 11 is a front elevation thereof; and,

Fig. 12 illustrates still another means for painting pipe.

Figure 1:
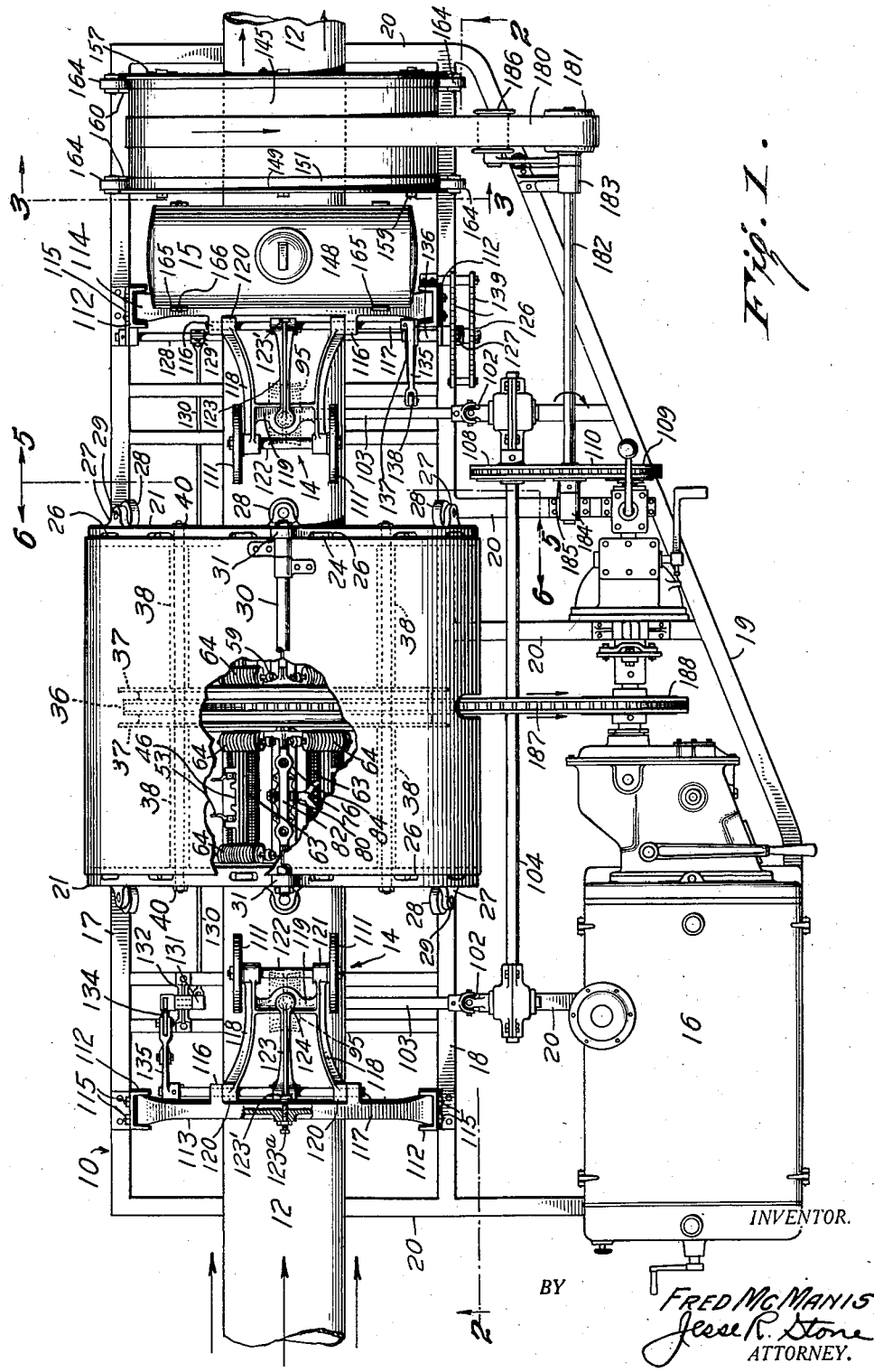

My complete device includes supporting and cleaning members mounted for operation on a frame and having associated therewith means for applying a coating to the pipe. In the drawings the operative parts are shown as mounted upon a frame, indicated at 10, said frame being made up of structural iron or steel, preferably of channeled construction. The frame comprises longitudinal side members 17 and 18 and end and cross members 20 connecting the side frame members. Mounted upon this frame is a pipe cleaning assembly indicated generally at 11. The supporting and pipe moving rollers are indicated at 13, the pipe being shown at 12. There are sets of upper rollers to resist rotation of the pipe, these rollers being designated by the numeral 14. The painting structure is shown at 15. On a supplementary frame 19 connected at one side of the main frame is a power unit designated by the numeral 16.

The pipe cleaning means forming the principal element in my device is shown particularly in Figs. 1, 2, 6 and 7. The device includes spaced circular frame members 21 at each end thereof, said frames being ring shaped and channeled in cross section, as shown in Fig. 7, to provide on the inner side thereof a groove or channel 23, in which are supported a series of spaced rollers 24 mounted upon pins 25 transversely of the channel. The rollers are mounted to project slightly from the inner rim of the frame member so as to furnish a bearing support for the rotatable elements therein. The frame 21 has lower brackets 22 formed thereon to fit upon the side frame members 17 and 18, to which they are adapted to be rigidly attached.

On the outer faces of the frame members 21 are laterally extending lugs 27 spaced about the frame adjacent the inner side thereof, said lugs furnishing a mounting for pins 29 projecting inwardly and supporting rollers 28, which furnish thrust members for the rotatable frame, as will be later pointed out. The rollers 24, previously referred to, are made accessible by radial openings 26 in the frame members, as will be understood from Figs. 6 and 7. The above described pair of rigidly mounted circular frames 21 serves as a support for the rotatable frame which carries the several pipe cleaning units, shown generally as at 33. This rotatable frame includes a pair of ring members 34 which are mounted to freely rotate within and be supported by the stationary circular frames 21. The outer surface of each of the ring members 34 is, of course, formed circular so that said members will freely rotate on the bearings formed by the rollers 24, whereas each of the ring members is provided with a relatively smooth outer side wall or face 35, so that it may provide a relatively true bearing with respect to the above mentioned rollers 28 which serve to take up the end thrust of said members. Said ring members 34 are connected in spaced relation by means of a plurality of longitudinal rods 39 extending through the inner rims of said rings and held therein by nuts 40.

A sprocket wheel 36 is centrally mounted with respect to the ring members 34, and is preferably located midway between said rings for the purpose of driving them in unison. Said sprocket wheel 36 is reinforced to prevent its distortion by providing along each side thereof a radial flange or rim portion 37. Said sprocket wheel 36 is secured upon the frame with the ring members 34, and the rods 39 extend through the rim portions 37 of said wheel. Tubular spacing members 38 between the opposite sides of the rim portions 37 of the sprocket wheel and the adjacent or inner sides of the ring members 34 serve to space the rings and sprocket wheel rigidly apart, thus forming a substantial frame.

The ring members 34 are each provided with a plurality of pairs of parallel inwardly extending arms 41 which may be either integrally cast therewith or otherwise secured thereto. The sprocket wheel or member 36 is likewise provided with inwardly extending arms 42 which may be identical in construction with the arms 41 and are arranged in direct alignment therewith longitudinally of the frame for a purpose to be later described. The inwardly extending arms 41 and 42 on the frame and sprocket wheel respectively are preferably ribbed for the purpose of affording the maximum amount of rigidity and are each provided with a plurality of sets or pairs of transversely extending openings, shown as at 43, along one edge and at 44 along the opposite edge. Each respective row of openings 43, 43 in adjacent arms are the same distance apart as are each row of openings 44, 44 in said pairs of arms. These pairs of openings 43 and 44, in addition to being evenly spaced, are arranged in staggered relation, the corresponding openings 43 being spaced radially a different distance from the center than are the openings 44 in the other arm. Thus, with reference to Fig. 6, the outermost opening 43 is spaced the same distance from the ring as is the outermost opening 48 in the adjacent arm 41.

In Figs. 8 and 9 I disclose in detail the removable pipe cleaning elements, generally shown as at 33, which may be readily placed between the inwardly extending arms 41 and 42 and removably fixed within the desired pairs of openings in these arms. These pipe cleaning units or assemblies 33 each comprise a substantially rectangular and integrally formed rack and have a pair of side members 45 and end members 46. Each of the side members 45 are preferably extended beyond the end walls 46, forming ears 47, which are formed with transversely extending and aligning openings to support the slidably mounted latch pins or bolts 48. Lugs 49 are formed upon the outer sides of the side members 46, which are likewise provided with openings, indicated at 50, for the purpose of receiving the reduced stem portions 51 of the pins or latches 48. Coiled springs 52 are located upon the reduced stem portions 51 of the latches 48 and interposed between the shoulders of the latches and the adjacent end of each of the lugs 49, and tend to force the latches 48 outwardly. Radially extending arms 53 are formed upon the outer end of each of the bolts 51 and serve as handles with which to manipulate said latches. A pair of lugs 54 may be cast integrally upon the outer side of each of the cross members 46 in position for engagement with the arms 53 when the bolts are withdrawn to retain the latches 48 in their inward positions, as, for example, when mounting or removing the pipe cleaning elements or assemblies 33 with respect to the arms 41 and 42. By properly spacing the arms 41 and 42 with respect to the outer or adjacent surfaces of the lugs 47 of the pipe cleaning assemblies 33, the removal or replacement of these assemblies may be readily accomplished.

A pair of inwardly extending lugs or ears 55 may be integrally formed with the side members 45 and preferably arranged substantially midway of the ends of said members. These opposite lugs 55 are each provided with aligning openings 56 for receiving the transversely extending pin 57, which are preferably held in position by means of the cotter pins 58.

Two pairs of reversely inclined and substantially formed bell crank levers 59 are provided with pivotal hub portions 60 and each pair is arranged to be mounted upon the pin 57 between the head thereof and the inner surface of the downwardly extending lug 55. The inwardly inclined arm portions of the bell crank levers 59 adjacent to the pipe 12 are provided near their extreme ends, with openings 61 for the reception of transversely extending and headed rods or shafts 62. A gang or series of pipe cleaning discs or cutters 63 is mounted upon each of the headed rods 62. For the purpose of applying pressure between the cutters or discs 63 and the outer surface of the pipe 12, I provide an individual coil spring 64 for each of the bell crank levers 59. These springs 64 are preferably mounted between ears 65 extending outwardly from the side members 45 and the discs 66, which are threaded upon the ends of rods 67 extending axially through said springs. Each of the rods 67 is provided with a polygonal head 68, which is in turn loosely mounted through an opening in the outer end of each of the bell crank levers 59. The tension of the springs 64 may of course be readily varied by manipulating the headed ends 68 of the bolts or rods 67 when it is desired to vary the pressure of the cutting discs 63 against the outer surface of the pipe.

In addition to the cutters I contemplate providing a brush 69 having relatively hard bristles, centrally mounted with respect to each of the assemblies 33 and to each of the sets of cutters 63.

With particular reference to Figs. 8 and 9, the lugs 49 at one end of frame 33 are extended inwardly and the ends 72 are each provided with transversely extending openings 73, which are aligned for the purpose of receiving a relatively short stub shaft 74. A lever 76, which is provided with a pair of outwardly extending forked arm portions 77, is pivotally mounted upon the stub shafts 74 and has its other end connected with the brush 69, so that the brush may not only tilt with respect to the pipe, but it may be moved radially away from the pipe. The forked portions of the arms 77 are slightly enlarged at their ends to receive the stub shafts 74 for permitting the pivotal movement of the arm 76 with respect to the cross member 46. The free end of this arm 76 is provided with a reduced shaft portion 78 extending at right angles with respect to the brush 69.

A relatively thin plate 79 is fastened upon the outer surface of the brush by screws, or other suitable means, and is provided with a pair of centrally disposed and upwardly extending ears 80, which are perforated to receive the reduced end or shaft portion 78 of the arm 76. The extreme end of the shaft 78 may be threaded for the reception of a lock nut 81, if desired, to prevent the accidental displacement of the brush 69 from said arm.

A bridge member 82 is shown as formed integrally with the side members 45 of the rectangular rack 33. Said member extends across the frame between the side members above the brush, as is clearly shown in Figs. 8 and 9. The bridge member 82 is formed with a pair of circular supports 83 with flanges 84 thereon. Expansion coil springs 70 are interposed between the upper surface of the plate and the supports 83 for the purpose of exerting a yieldable pressure inwardly upon the bristles of the brush, causing them to engage the pipe 12. As seen in Fig. 8a, the brushes have bearing brackets 88 beneath said springs 70, the central boss of each bracket being formed to fit within the ends of the springs. Bolts 86 have heads 87 fitting beneath said brackets 88 with the outer face of said heads rounded to allow a tilting motion of the brush. The outer ends of the bolts engage within nuts or plates 71 on the supports 83 and may be held in position by cotter pins, as shown.

It may now be readily understood that although the rectangular rack constituting the cleaning assembly, indicated generally as at 33, is preferably integrally formed and substantially rigid, yet both of the gangs 63 of cutters are independently movable and may be deflected outwardly against the tension of their control springs 64, as, for example, when the discs or cutters are riding over a coupling on the pipe. The brush 69, too, may readily tilt by rocking upon the shaft 78 against the tension of the springs 70, and this element may also easily ride upon the coupling of the pipe without binding.

In order to prevent the dust or other particles of foreign matter, which are cleaned from the pipe during its operation, from being scattered about the machine, I may provide a cover or housing 90, which would extend across both sections or sets of the pipe cleaning elements or from one of the circular frames 21 to the other. Although the cover 90 is shown as formed of two sections and hinged from the cross bar 30, it may of course be formed in any other desired manner.

Figure 5:
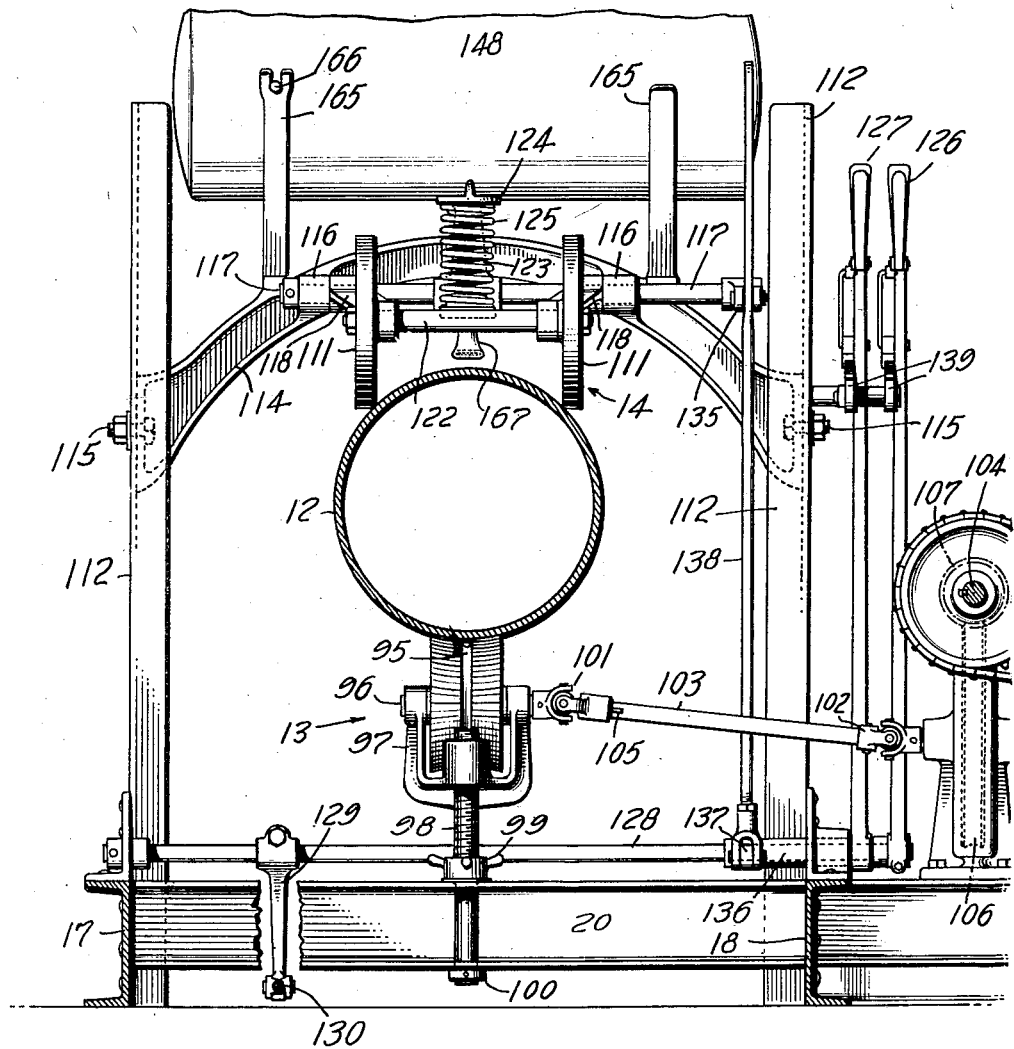
Fig. 5 is a transverse sectional view taken on the line 5—5 through Figs. 1 and 2 and looking in the direction of the arrows.

Rollers, indicated generally as at 13, are provided at each end of the housing 90 in the frame. These rollers partially support the pipe and feed it lengthwise. Each roller, as shown in Fig. 5, is preferably formed with circumferentially extending grooves 95, approximately midway of its ends, for the purpose of dividing it so as to more effectually grip the pipe. These rollers are toothed longitudinally and are each mounted upon a shaft 96, which is supported by a yoke or frame 97, indicated in Figs. 2 and 5. Each of these yokes is supported in adjustable positions by means of a pair of vertically extending and threaded shafts 98 at each end of the yoke, said shafts being in turn extended through the adjacent channel members 20 for rotative movement therein. Enlarged hubs or collars 99 are securely fixed to the threaded shafts 98, approximately midway of their lengths and are adapted to rest upon the upper surfaces of the channel members 20 for effectually supporting its portion of the weight of the pipe 12. It may be readily seen that when it is desired to raise or lower the rollers 13, it is only necessary to rotate the threaded shafts 98 by means of the projections or arms, which are integrally formed with the hubs 99. Suitable collars 100 may be pinned or otherwise secured to the lower portions of the vertically extending shafts 98 for preventing their displacement with respect to the channel members 20.

The shafts 96 and the rollers 95 are rotated by means of a shaft 103 connected with shafts 96 by means of universal joints 101, and to a power line by way of the universal joints 102, which are in turn simultaneously driven by operative engagement with the longitudinally extending shaft 104. The hubs of the universal joints 101 may be slidably keyed as at 105, with respect to the shafts 103, which will permit the raising and lowering of the feeding rollers 95 without binding. Referring particularly to Figs. 1 and 5, it will be noted that the stub shafts of the worm gears 106 are arranged to drive the shafts 103, whereas the worms 107 mating with the gears 106 are keyed to the longitudinally extending shaft 104 for driving rollers 13 in unison. The shaft 104 is driven from the motor or unitary driving mechanism 16 through the medium of the sprocket wheels 108 and 109, and the sprocket chain 110. Suitable gear-change or speed reduction means may be employed between the sprocket wheel 109 and the motor 16.

Figure 2:
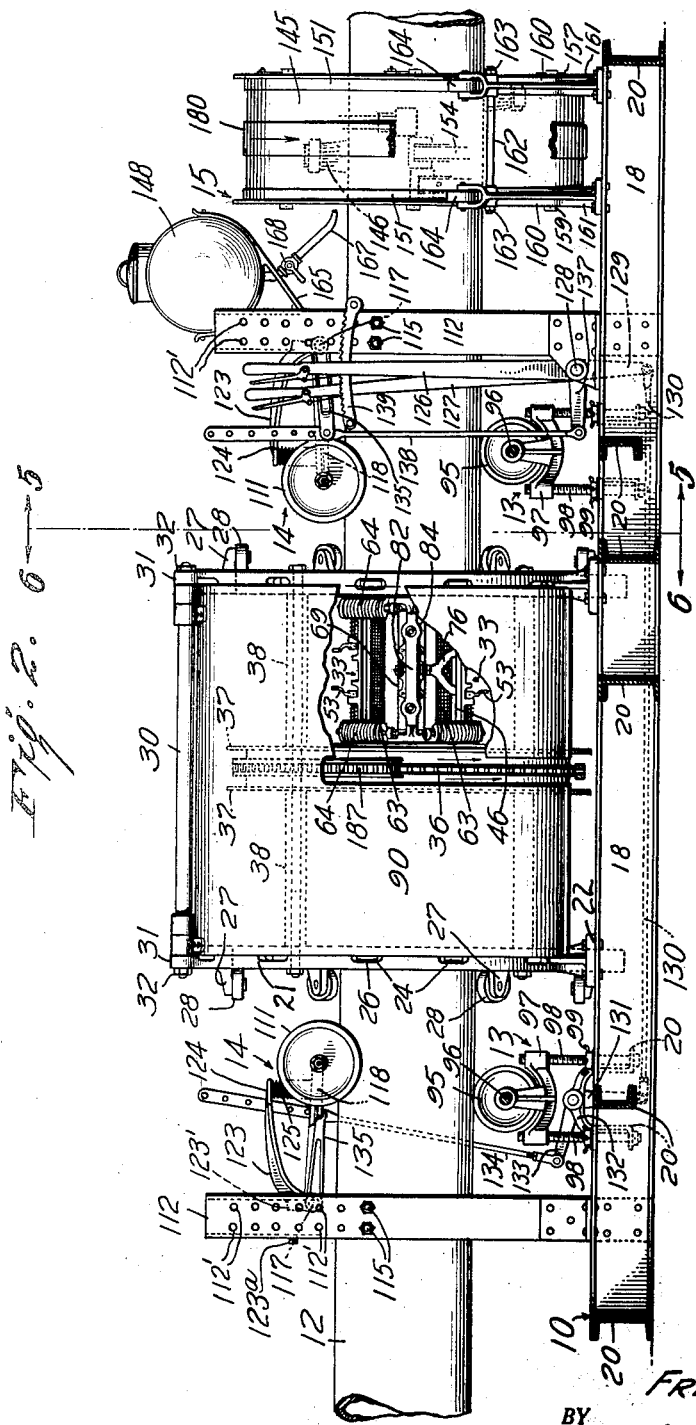
Fig. 2 is a longitudinally sectional view taken on the line 2—2 of Fig. 1, looking in the direction of the arrows and partially broken away.

My means for preventing the rotation of the pipe during its lengthwise movement, which is indicated generally as at 14, comprises two pairs of spaced and hardened discs 111, which are resiliently mounted above the feeding rollers 13. Upright supporting posts of channel construction 112 are riveted or otherwise secured to each of the longitudinally extending channel members 10, said posts being preferably located adjacent to the feeding rollers 13, as is shown in Figs. 1, 2 and 5. Vertically and adjustably supporting members 113 and 114 at opposite ends of the machine are secured between the pairs of oppositely disposed posts 112, and are held in their desired positions by means of the bolts 115 which pass through a pair of openings 112' located in the said posts.

Integrally formed or otherwise secured to one side of each of the supporting members 113 and 114 is a pair of spaced lugs 116, which are provided with horizontally aligning openings for the reception of the loosely mounted shafts 117. A pair of spaced arms 118 are pivoted at one end upon the shaft 117 and may be integrally connected by means of a cross member 119. Both of these arms are provided at their supported ends with hub portions 120 having aligning openings to receive said shaft 117. The ends 120 are arranged to fit between the inner surfaces of the lugs 116, so as to prevent their lateral displacement with respect thereto. The free ends of the arms have bearings 121 to receive a shaft 122, which may be rotatably mounted therein for the purpose of supporting, upon each end thereof, one of the relatively hard pipe engaging discs 111.

Securely mounted upon each of the shafts 117 substantially midway between the arms 118 is an arm 123 which extends to a point above the cross member 119 and is provided at this end with a slightly enlarged head 124 thereon. A coil spring 125 is interposed between the lower surface of the head 124 and the upper surface of the cross member 119 for the purpose of yieldingly forcing the arms and the discs 111 downwardly upon the pipe, so as to effectually prevent rotation of said pipe.

Each of the arms 123 is formed with an integral projection 123' at its rear end, a relatively short distance above its connection with shaft 117, to bear against the end of the adjusting screw 123a, when the arm 123 is in its uppermost position, thus limiting the upward play of the arms (see Fig. 2).

For the purpose of increasing or decreasing the pressure of each pair of discs 111 against the pipe 12 from a point convenient to the operator, I provide a pair of vertically extending and suitably spaced hand operated levers 126 and 127. The lever 126 is securely mounted upon one end of the shaft 128 mounted transversely of the frame 112, and to which is secured a downwardly extending arm 129. Said arm pivotally supports one end of a longitudinally extending rod 130, the opposite end of which is loosely mounted upon the free end of a lever 131, which is in turn carried upon a stub shaft pivoted to a bracket 132 mounted on the frame. At the opposite end of the stub shaft is secured a laterally extending arm 133, whose outer end loosely supports the lower end of the rod 134. The upper end of this rod 134 is preferably widened and formed with a plurality of suitably spaced openings so that it may be adjustably connected with respect to an arm 135. Thus the rod may be varied in length to suit the sizes of pipe to be cleaned. As is clearly shown in Fig. 5 of the accompanying drawings, the hand operating lever 127 is mounted upon a pivotally supported sleeve portion 136 having fixed thereon an arm 137 which controls vertically extending rod 138, connected with arms 135 upon the shaft 117, for the purpose of regulating the tension of the spring 125, as just described. Segments 139 may, of course, be associated with the hand operating levers 126 and 127 to assist in latching them in their desired positions.

The painting and brushing mechanism 15 employed with my invention is mounted upon the frame 10 to uniformly cover the outer surface of the pipe by applying paint or other similar coating to it immediately after its cleaning operation. Said machine comprises a rotatably mounted housing or drum 145, a plurality of equi-distantly spaced brushes 146, drum supporting means 147, and a paint reservoir 148.

The drum 145 is preferably constructed of sheet metal and consists of a tubular body portion, a pair of end ring portions 149 and a plurality of spaced longitudinal angle members 150 securely riveted or otherwise secured around the inner side of the cylindrical portion. The angle members 150, in addition to firmly bracing the drum 145, serve as means for gathering any paint that may drip or be thrown from the brushes 146, carrying it upwardly and dropping it upon the pipe so that it may be evenly brushed upon the surface thereof during its rotative movement. A pair of circumferentially extending bands or hoops 151 of leather or similar material may be secured to the outer surface of the drum 145 at each end for bearing purposes.

The brushes 146 are each detachably supported within a clamp 152, which is provided with a laterally extending arm 153, shaped to receive one end of a leaf spring 154, whose opposite end is attached to an arm 155. Each of the arms 155 are pinned or otherwise secured upon a transversely extending shaft 156 which is mounted at its ends to oscillate in bearings within the rims or flanges 149 of the drum. Each of the shafts 156 has fixed upon one of its outer ends a relatively stationary arm 157, having an arcuate slot therein, which is adapted to receive a clamping bolt 158 fixed in the frame. The opposite ends of these shafts are provided with suitable collars 159 for the purpose of preventing their displacement with respect to the drum. A plurality of leaf springs 154 may be employed, if desired. It may be here noted that the brushes are preferably staggered lengthwise, as seen in Fig. 2, so as to effectually apply the paint evenly along the entire length thereof.

When it is necessary to substantially increase or decrease the tension of the springs against the brushes 146, or in adjusting them for various sizes of pipe, it is but necessary to loosen the clamping bolts 158 with respect to the arms 157 and oscillate the shafts 156 to the desired location, and again tighten the bolts.

The drum 145 is mounted for rotation within a frame 147 which includes a pair of arcuate plates 160 which are provided with downwardly extending legs 161 for securing them to the longitudinally extending channel members 10. For the purpose of maintaining the spaced relation of the curved plates 160, I may provide a plurality of transversely extending tie rods 162 secured to said plates by means of nuts 163. These curved plates 160 furnish a support for loosely mounted rollers 164 which bear against the hoops 151 and between the outer edges of the side or ring portions 149. This relatively soft band 151, being interposed between the drum 145 and the rollers 164, permits of a comparatively quiet rotative movement between this relatively light drum and its substantially rigid supporting means.

Figure 3:
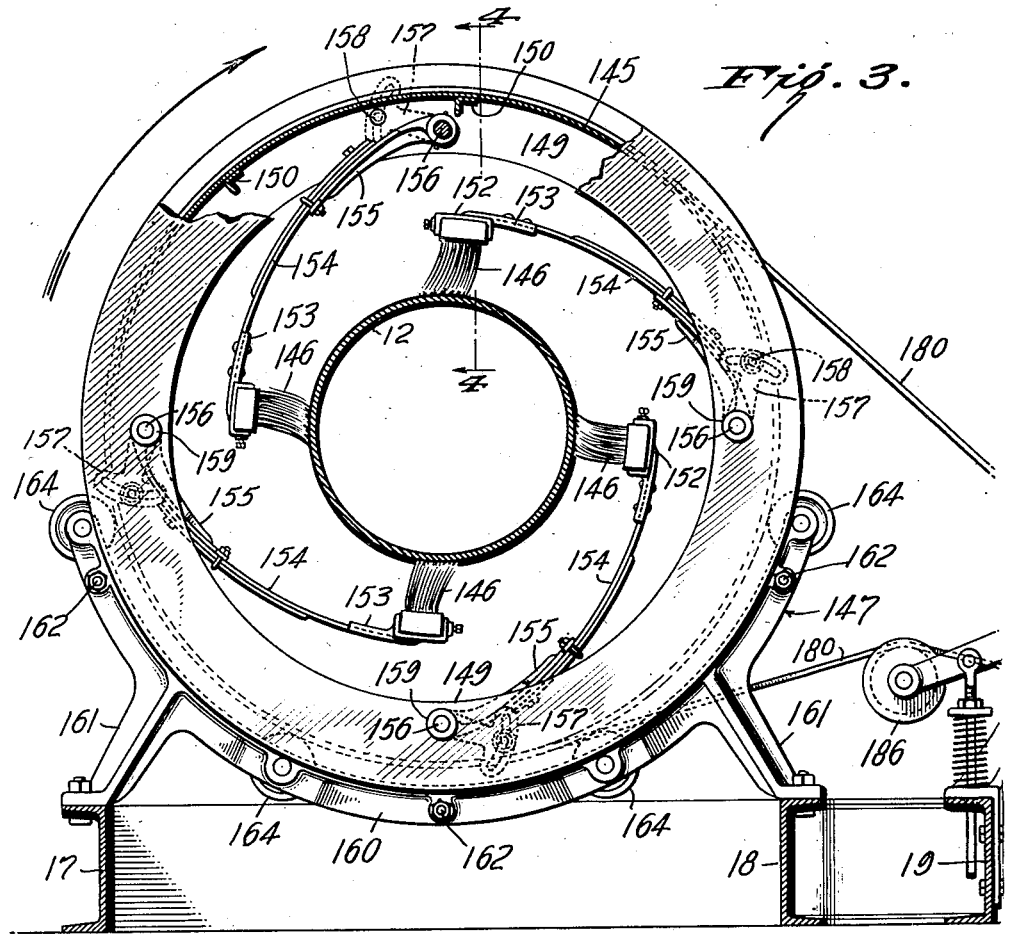
Fig. 3 is a transverse sectional view taken on the line 3—3 of Fig. 1, looking in the direction of the arrows, showing a portion of the painting mechanism associated with my invention.
Figure 4:
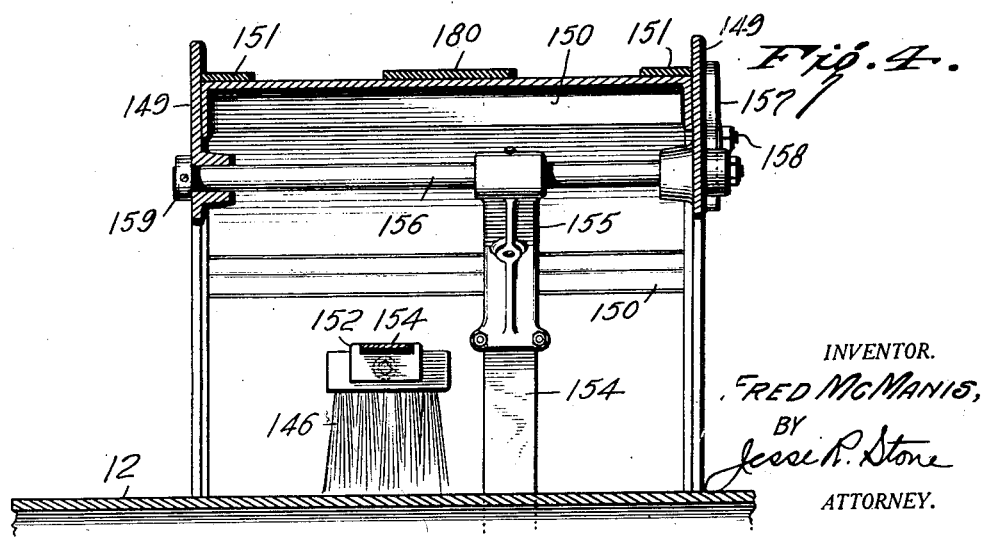
Fig. 4 is a section on the line 4—4 of Fig. 3, looking in the direction of the arrows.

A belt 180 may be employed for rotating the drum 145, said belt being driven from the relatively short pulley 181, which is keyed to one end of the shaft 182. Said shaft 182 is rotatably mounted in the bearings 183 and 184, which are supported upon the beams 19 and 20. A sprocket wheel 185 is keyed or otherwise fastened near the end of the shaft 182, adjacent to the bearing 184, and is arranged to be driven from the sprocket chain 110, as is clearly shown in Fig. 1. An idler pulley 186 is pivotally supported from the shaft 182 and may be yieldingly supported against the belt 180, as shown in Fig. 3.

Since it is desirable to drive the pipe cleaning and brushing elements positively, I employ a sprocket chain 187, which is disposed btween the sprocket wheel 36 and the relatively smaller sprocket wheel 188 mounted upon the power shaft of the driving means 16.

The reservoir 148 for containing the desired pipe coating compound is preferably supported upon the member 114 by means of a pair of brackets 165 having curved seats at the upper ends thereof. As seen from Fig. 5, slots may be formed through the upper ends of one of the brackets 165 for the purpose of engagement with the pins 166, carried by the reservoir 148, so as to prevent displacement or any rotative movement between the reservoir and its supports. A tube 167 having a flared end adjacent to the pipe is suitably connected to the reservoir 148 for directing the painting compound upon the pipe 12, the desired distance from the rotatable brushes. A valve 168 is preferably employed for regulating or cutting off the flow of the painting liquid from the reservoir 148. A relatively large filling opening is desirably located upon the upper end of the reservoir 148.

In operating my device, the frame 10 with the device mounted thereon, as disclosed in the drawings and described, is adjusted to receive the pipe 12. As the device is constructed for operating upon different sizes of pipe, the supporting elements, including lower rollers 13 and upper rollers 14, will be adjusted to operate upon the particular size of pipe which is to be cleaned. The supporting posts 98 will be adjusted so as to raise or lower the supporting yoke 97 for the rollers 95 so as to hold the pipe in proper position centrally of the pipe cleaning device. The upper guide rollers 14 will be adjusted into the proper position through the set screws 123a and the operating rods 128 will be connected with the lever arm 135, as previously set out, so as to press the said rollers 111 firmly against the upper side of the pipe, bringing the sharp edges of said rollers against the pipe so as to allow the pipe to travel through the machine but to resist any tendency of the pipe to rotate under such torsional strain as may be exerted thereon by the cleaning elements which rotate about the same.

The pipe, when extended through the machine, will furnish a gauge for the adjustment of the frames 33 upon which the cleaning elements are mounted. As can be seen from Fig. 6, the frames 33 will be connected by the pins 48 within the proper openings 43 and 44 in the arms 41 so as to bring the cleaning elements into proper relation to the pipe. It will be noted that the pins 48 which support the frame of the cleaning elements 33 may be adjusted into any pair of openings 43 or 44. The elements are shown in Fig. 6 as being mounted with the pins 48 in the outermost openings 43, but if it were desired to set the frame farther away from the pipe in the case of a larger size of pipe, the pins 48 could be moved into the outermost of the openings 44, or if the pipe were still larger they could be adjusted into the second pair of openings 43, and it will be noted that the arrangement of the openings allows for a large number of adjustments of the frame radially toward or away from the pipe.

With the frame 33 properly adjusted the pressure upon the cutters may be adjusted through tightening or loosening the tension upon the springs 64, as previously described. The tension upon the brush can be also adjusted by means of the nuts or plates 71 upon the outer ends of the bolts 86 connected with the said brush. It will be noted that the brush may be tilted along its longitudinal axis through the connection of the brushes with the heads of the bolts 86, as shown in Fig. 8a, and that they may be tilted along their horizontal axes provided by the shaft 78 through compression of the springs 70.

The device, when properly adjusted, may be rotated and controlled through the driving mechanism which has been previously described, and the frame may be rotated within the supporting structure provided by the end frame members 31 and the connecting rods, the device rotating as shown by the arrow in Fig. 6. While the cleaning elements are thus being rotated about the pipe, the pipe itself will be moved longitudinally as shown by the arrows in Fig. 1, and this will be accomplished through the rotation of the supporting traction rolls or wheels 95 through the driving connections including the shafts 103 and 104, as previously described.

As the pipe is thus moved through the machine, it will be thoroughly cleaned of rust, scale or corrosion, and as it passes from the cleaning device, it will receive a coating of some paint or any desirable liquid covering through the painting device which has been described, and which is shown particularly in Fig. 3. The coating will be fed to the pipe through the conducting tube 167 and this paint will be brushed in an even coating about the pipe by the rotating frame 149, carrying with it the brushes 146. The paint delivering tube 167 may be replaced by the structures shown in Figs. 10 to 12 inclusive, if desired, and as has previously been noted, the paint will thus be delivered at a speed proportionate to the speed of movement of the pipe itself longitudinally through the machine.

It will be seen that I have provided a unitary device for the thorough cleaning and coating of the pipe in a structure wherein the cleaning device is mounted upon a stationary support and the pipe is moved longitudinally therethrough. My invention thus consists not only in the particular mounting and support of the cleaning elements but in the construction of the cleaning device itself, and it is to be understood that this cleaning structure may be otherwise mounted or supported either stationary or movable as desired without departing from the spirit of my invention. The advantages of the structure will be obvious to those skilled in the art.

What I claim as new and desire to protect by Letters Patent is:

1. In a pipe cleaner, a base, a pair of circular frame members supported thereon, a rod connecting said frame members, a housing of sheet metal hinged to said rod, said frame members being channeled on their inner faces, rollers in said channels and a rotatable cleaning device supported on said rollers.

2. In a pipe cleaner, a base, a pair of circular frame members supported thereon, said frame members being channeled on their inner faces, rollers in said channels, a rotatable cleaning device supported on said rollers, and thrust bearing rollers on said frame members bearing on the ends of said device.

3. In a pipe cleaning device, a pair of circular frame members spaced apart, a rod connecting the upper ends of said frame members, a housing longitudinally divided and hinged to said rod, rollers mounted on the inner faces of said frame members, and a rotatable cleaning device supported on said rollers.

4. A pipe cleaner including end ring members, a central sprocket ring member, means connecting said rings to form a rigid frame, pairs of arms on said rings extending inwardly therefrom, said arms being in alignment longitudinally of said frame, said arms being formed with a plurality of rows of bearing openings therein in each arm, a cutter supporting rack adapted to be connected within any desired pair of said openings, and pipe cleaning elements flexibly mounted upon said rack.

5. A pipe cleaner including end ring members, a central sprocket ring member, means connecting said rings to form a rigid frame, pairs of arms on said rings extending inwardly therefrom, said arms being aligned longitudinally of said frame, said arms being formed with a plurality of rows of bearing openings in each arm, a cutter supporting rack adapted to be detachably connected in any desired pair of said openings, arms pivoted on said rack, cutters on said arms, and means connected with said arms to force said cutters inwardly toward the pipe.

6. A cleaner including a frame having ring members thereon, pairs of arms on said ring members extending inwardly therefrom, said arms being aligned longitudinally of said frame and formed with rows of openings therein spaced in staggered relation upon said arms, a cutter supporting rack detachably connected in any desired pair of said openings, arms pivoted on said rack, cutters on said arms and means to rotate said frame.

7. A pipe cleaner including end ring members and a central sprocket ring member, said members being connected to form a rigid frame, inwardly projecting arms arranged in pairs on said rings, said arms being formed with two rows of bearing openings therein in each arm, a cleaner rack, a pair of sliding bolts at each end thereof adapted to engage within selected pairs of said openings, arms pivoted on said rack, cutters on said arms adapted to contact with the pipe, and means connected with said sprocket ring member to rotate said frame.

8. A pipe cleaner including end ring members, a central sprocket ring member, means connecting said ring members to form a rigid frame, inwardly extending arms on said ring members having aligned openings therein, a cleaner rack mounted in said arms and adjustable radially to or from the pipe, arms pivoted on said rack, cutters on said arms adapted to contact with the pipe, means to force said cutters resiliently inward, and means connected with said sprocket ring member to rotate said ring.

9. A pipe cleaner including a plurality of spaced ring members, means connecting said rings to form a rigid frame, pairs of arms on said ring members extending inwardly therefrom, said arms being formed with parallel rows of bearing openings in each arm, a cleaner rack, means to detachably connect said rack within selected pairs of said openings, inwardly projecting supports centrally of the sides of said rack, a shaft on said supports, pairs of bell crank levers on said shaft, cutters mounted on one end of each pair of said lever arms, and resilient means bearing on the opposite ends of said arms to force said cutters inwardly.

10. A pipe cleaner including spaced ring members, means to hold said ring members rigidly together, a plurality of pairs of arms extending inwardly from said ring members, said arms being formed with parallel rows of bearing openings therein on each arm, a cleaner rack mounted in said arms and adjustable radially to or from the pipe in said openings, a shaft supported by said rack, pairs of bell crank levers on said shaft, one pair of arms on said levers having a cutter rod supported therein, cutters on said rod, and means connected with said levers to force said cutters inwardly.

11. A pipe cleaner including ring members, means connecting said members together forming a frame, supporting arms projecting inwardly from said frame, a cutter supporting rack adapted to be connected adjustably to said arms, a shaft supported by said rack, levers pivoted on said shaft, cutters mounted on said levers, and means bearing on said levers to force said cutters resiliently inward toward said pipe.

12. An approximately cylindrical cleaner frame, inwardly extending arms arranged in pairs aligned longitudinally thereof, racks mounted adjustably in said arms, cleaning elements on said racks, and means to rotate said frame.

13. An approximately cylindrical cleaner frame, inwardly extending arms arranged in pairs aligned longitudinally thereof, racks mounted detachably upon said pairs of arms, cleaning elements in said racks, means to hold said cleaning elements against a pipe, and means to rotate said frame.

14. An approximately cylindrical cleaner frame, inwardly extending arms arranged in alignment on said frames, racks mounted adjustably in said arms, gangs of cleaning cutters mounted on said racks, means to hold said cutters inwardly, and means to rotate said frame.

15. An approximately cylindrical cleaner frame, supports on the inner side of said frame, racks mounted in said supports, cleaning elements on said racks, and a sprocket wheel on said frame operatively connected to a rotating member to rotate said frame.

16. A rotatable cleaner frame, supporting members on said frame, racks mounted in said members, a transverse shaft on said racks, pairs of levers on said shaft, cleaning cutters on said levers, an inwardly extending arm on said frame, and a brush on said arm.

17. A rotatable cleaner frame, supporting members on said frame, racks mounted on said frame, transverse shafts on said racks, pairs of levers on said shafts, cleaning cutters on said levers, an inwardly extending arm on said frame, a brush on said arm, and a spring mounted on said arm to force said brush resiliently inward toward the pipe.

18. A pipe cleaner including end ring members, a sprocket ring member, means connecting said rings to form a rigid frame, pairs of arms on said rings extending inwardly therefrom, said arms having therein a plurality of rows of bearing openings in each arm, a cutter supporting rack adapted to be connected with any desired pair of said openings and pipe cleaning elements flexibly mounted upon said rack.

19. A pipe cleaner including a rigid frame, pairs of arms on said frame extending inwardly therefrom, said arms being formed with a plurality of rows of bearing openings in each arm, a cutter supporting rack adapted to be detachably connected in any desired pair of said openings, arms pivoted on said rack, and cutters on said arms.

20. A cleaner including a frame having ring members thereon, pairs of arms on said ring members extending inwardly therefrom, said arms being aligned longitudinally of said frame and formed with rows of openings therein spaced in staggered relation upon said arms, a cutter supporting rack detachably connected in any desired pair of said openings, cutters on said rack, and means to rotate said frame.

21. A pipe cleaner including a rigid frame, inwardly extending arms on said frame having aligned openings therein, a cleaner rack mounted on said arms and adjustable radially to or from the pipe, arms pivoted on said rack, cutters on said pivoted arms adapted to contact with the pipe, means to force said cutters resiliently inward, and means to rotate said frame.

22. A pipe cleaner including a frame, a plurality of pairs of arms extending inwardly from said frame, said arms being formed with parallel rows of bearing openings therein on each arm, a cleaner rack mounted on said arms and adjustable radially to or from the pipe in said openings, a shaft supported by said rack, levers on said shaft, a cutter rod supported on said lever, cutters on said rod, and means connected with said levers to force said cutters inwardly.

In testimony whereof I hereunto affix my signature this 16th day of March, A. D. 1928.

FRED McMANIS.